United States Patent

Baum

[15] 3,636,927
[45] Jan. 25, 1972

[54] ANIMAL LITTER AND PROCESS

[72] Inventor: Harold M. Baum, Pepper Pike, Ohio
[73] Assignee: SCM Corporation, Cleveland, Ohio
[22] Filed: June 18, 1970
[21] Appl. No.: 47,600

[52] U.S. Cl. ...................................119/1, 260/611 F
[51] Int. Cl. ..........................................A01k 67/00
[58] Field of Search........................119/1; 260/611 F

[56] References Cited

UNITED STATES PATENTS

| | | | |
|---|---|---|---|
| 3,425,397 | 2/1969 | Schulein et al. | 119/1 |
| 3,354,225 | 11/1967 | Kane | 260/611 F |
| 3,286,691 | 11/1966 | McFadden | 119/1 |

*Primary Examiner*—Aldrich F. Medbery
*Attorney*—Merton H. Douthitt, Howard G. Bruss, Jr., Russell L. Brewer, James E. Carson and Harold M. Baum

[57] ABSTRACT

Odor-inhibiting litter materials comprising litter containing an odor-inhibiting quantity of a compound of the formula:

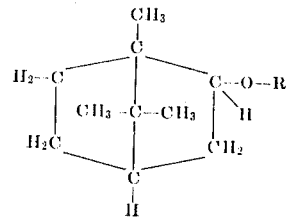

where R is selected from the group consisting of

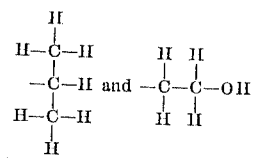

are described. Materials formed in accordance with this invention exhibit odor-inhibiting or odor-masking properties. The odor-inhibiting litter materials of this invention are advantageous in that they can be used as animal bedding and the like to mask and/or prevent the formation of undesirable odors in animal laboratories, pet shops, and the like.

7 Claims, No Drawings

ANIMAL LITTER AND PROCESS

DESCRIPTION OF THE PRIOR ART

The closest prior art known to applicant is U.S. Pat. No. 3,354,225, issued to Kane, Nov. 21, 1967, which discloses the novel compounds used in forming the odor-inhibiting compositions described in the present application.

SUMMARY OF THE INVENTION

The present invention relates to a novel class of odor-inhibiting products consisting of a conventional animal litter material containing an odor-inhibiting compound.

Animal litter is conventionally used as a sorptive agent for animal excreta and many such conventional materials do not mask odors or do so for only short periods of time. Products containing odor-inhibiting quantities of a compound falling within the scope of this invention effectively mask or inhibit odors generally associated with warmblooded animals and animal environments for a substantial length of time.

The term "animal environment" as used herein is intended to mean and to include warmblooded animals and areas, surfaces, and enclosures where these animals reside, by choice or because of man's will.

DESCRIPTION OF THE PREFERRED EMBODIMENTS

The compositions of this invention are relatively nontoxic to man and warmblooded animals in amounts above those which are effectively odor-inhibiting.

The odor-inhibiting compounds of the present invention are camphane derivatives. Known homologs or analogs of the odor-inhibiting compounds have an odor unlike and distinctly different from the cedar odor of the class of compounds herein described.

The odor-inhibiting compounds of this invention are of the formula:

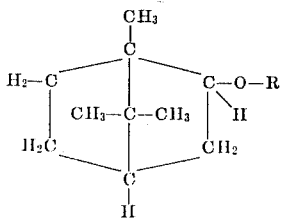

where R is selected from the group consisting of

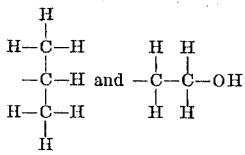

One of the compounds falling within the scope of formula I is 2-isopropoxy-camphane, a compound characterized in having a boiling point of 138° C. at 100 mm. pressure and 84° C. at 10 mm. pressure, a specific gravity of 0.882 and an index of refraction ($n_{15}$) of 1.4538.

Another compound of this invention falling within the scope of formula I is 2-($\beta$-hydroxyethoxy)-camphane. This compound is characterized in having a boiling point of 121° C. at 10 mm. pressure, a specific gravity of 0.990 and an index of refraction ($n_{15}$) of 1.4800.

The above compounds, while distinctly different in structure, chemical and physical properties from the compounds associated with cedar oil, surprisingly have the odor commonly associated with that material. The odor-inhibiting camphane derivative compounds of this invention also have an odor distinctly different from known analogs and homologs of these compounds. Thus, for example, 2disclosed by Simonsen on page 367 of Vol. II of "The Terpenes," published by Cambridge University Press in 1949, has a camphoraceous odor. Other related compounds including 2-ethoxy-camphane, 2-n-propoxy-camphane, 2-isobutoxy-camphane, 2-n-butoxy-camphane, 2,2-butoxy-camphane, 2-n-hexoxy-camphane, 2-($\beta$-methoxy-ethoxy)-camphane, 2-cyclohexoxy-camphane, and 2-tetrahydrofurfuroxy-camphane generally have either a camphoraceous or an unpleasant odor in contrast to the pleasant odor of natural cedar oil and the pleasant cedar odor of the camphane derivatives used in this invention. Other known, related compounds have been disclosed by Simonsen on page 448 of Vol. II of "The Terpenes," above referred to, including 2-ethoxybornylene and a bornylene ethyl ether prepared from the enol of camphor. These compounds are also characterized in having a camphoraceous rather than a cedar odor. The compound 2-methoxy-camphane which also has a camphoraceous odor is disclosed in reports in the Association of Camphor Industry of Engineering of Japan, Report No. 21, page 188, published in 1956.

The compounds above referred to have a chemical structure closely related to camphor and expectedly have a camphoraceous or camphorlike odor which does not suggest and is not otherwise identifiable with cedar oil or the odor of cedar oil. Therefore, it is unexpected that an analog and isomer of one of the compounds (e.g., 2-isopropoxy-camphane) used in this invention, specifically 2-n-propoxy-camphane has a camphoraceous odor whereas 2-isopropoxy-camphane has a cedar odor. As noted above, homologs of compounds falling within the scope of the above formula, for example 2-ethoxy-camphane, the position isomers of 2-butoxy-camphane and the position isomers of 2-pentoxy-camphane have a camphoraceous or camphorlike odor. The specific compounds used in this invention, 2-($\beta$-hydroxyethoxy)-camphane and 2-isopropoxy-camphane have an odor which is indistinguishable from the odor of cedar oil.

One aspect of the present invention provides a class of products comprising an odor-inhibiting amount of a compound falling within the scope of formula I and an inert carrier conventionally used in the art.

The amount of such compound employed in the odor-inhibiting products or compositions of this invention can vary widely between about 0.1 to about 25 weight percent basis the weight of the composition and will depend upon the carrier used, the amount of odor to be inhibited, and the length of inhibition desired. Usually, the products contain between about 0.5 to about 5.0 weight percent of at least one of the cedar odor camphane derivative compounds hereinbefore described, the compound(s) being in intimate contact with the carrier.

The carrier employed can be any carrier conventionally used as animal litter with the proviso that it should be inert (i.e., it should be incapable of undergoing a chemical reaction with the odor-inhibiting material). Such carrier should also be one that will not be harmful to man or warmblooded animals. The carrier can be any one of a variety of organic and inorganic solid carriers conventionally used in animal litter and can be a mixture of such carriers.

Solid carriers which can be used in the products of this invention include inorganic solid materials. Suitable solid inorganic carriers include siliceous minerals such as clays (e.g., bentonite, attapulgite, fuller's earth, diatomaceous earth, kaolin, mica, talc, sand, finely divided quartz, etc.) as well as synthetically prepared siliceous materials such as silica aerogels and precipitated and fume silicas.

Examples of solid organic materials include wood chips, wood shavings, wood sawdust, excelsior, wood fiber products, paper products, shredded polymers such as polyurethane, polyethylene, polypropylene, and the like.

Compounds falling within the scope of formula I are generally liquids at room temperature. The products of this invention can be formed by any conventional way of contacting a solid with a liquid such as: mixing the two together with a conventional mixer; pouring or spraying the liquid onto the carrier and recovering the excess liquid; atomizing the liquid and applying it to the carrier, vaporizing the liquid and bringing it in contact with the cooled carrier; and the like. The products of this invention are preferably formed by atomizing the liquid and applying it to the carrier while the carrier is being tumbled. This produces equal application of the atomized liquid.

The products of this invention can also include a conventional insect repellent, such as dimethyl phthalate, N,N-diethyl-m-toluamide, 2-ethyl-1,3-hexanediol, 2-phenylcyclohexanol, dibutyl adipate, and the like, which often gives the materials insect repellent properties and longer effective odor-inhibition. The amount of such insect repellent employed to effectively repel insects can vary between about 0.01 and 10 weight percent basis the weight of the product. Usually the materials contain between about 0.05 to about weight percent of such insect repellent basis the weight of the product, the insect repellent being in intimate contact with a compound falling within the scope of formula I and the carrier.

As will be evident from the examples, the products of this invention, when applied at the appropriate levels, effectively inhibit or mask odors of animal environments such as cages, pens, enclosures, beddings, and areas and surfaces in which animals such as rats, mice, hamsters, guinea pigs, rabbits, squirrels, monkeys, dogs, cats, raccoons, ocelot, woodchuck, fox, badger, hedgehog, bush baby, civet, chickens, birds such as parrot, cockatoo, mynah, macaw, owl, and the like are enclosed or reside.

The following examples are intended to illustrate the invention but not to limit the scope thereof, parts and percentages being by weight unless otherwise specified.

EXAMPLE 1

2.0 weight percent basis the weight of the shavings of 2-isopropoxy-camphane is atomized and applied to oak wood shavings. The treated shavings (250 grams) are placed on the floor of a laboratory animal cage for use as litter or bedding. The cage dimensions are 30 inches long, 20 inches wide, 15 inches high.

An identical amount of cedar shavings (a standard odor-inhibiting animal litter) is placed in an identical animal cage.

The third identical animal cage containing an equal amount of untreated oak wood shavings is used as a control.

Three adult hamsters are confined to each of the three test cages. Odors originating in each cage are empirically determined at 24-hour intervals.

Undesirable odors are evident after 24 hours in the control cage having untreated oak shavings as litter. No objectionable odors are emitted from the other two test cages, only a cedar odor is present. The cage emitting objectionable odors is removed from the test and the two remaining cages are investigated for odors during the following 4 days. After 5 full days, there is a slight undesirable odor being emitted from both remaining cages, signaling the need to change both the standard cedar shavings and the oak shavings treated with 2-isopropoxy-camphane.

EXAMPLE 2

The procedure of example 1 is repeated, except that the oak wood shavings are treated with 2-($\beta$-hydroxyethoxy)-camphane. The odor-inhibiting activity of the shavings treated with 2-($\beta$-hydroxyethoxy)-camphane is substantially the same as or slightly greater than that exhibited in example 1 for oak wood shavings treated with 2-isopropoxy-camphane.

EXAMPLE 3

The procedure of example 1 is repeated using cages of the same dimensions each containing two test rabbits approximately six weeks old. 2-isopropoxy-camphane is applied to shredded paper which is placed in the cages (250 grams per cage).

Undesirable odors are evident after 24 hours in the control cage containing untreated shredded paper. Objectionable odors are emitted by the cage containing treated shredded paper and the cage containing cedar shavings after 96 hours, necessitating the change of litter in the two remaining cages.

EXAMPLE 4

The procedure of example 3 is repeated, except that the shredded paper is treated with 2-($\beta$-hydroxyethoxy)-camphane. The odor-inhibiting activity of the shredded paper treated with 2-($\beta$-hydroxyethoxy)-camphane is substantially the same as or slightly greater than that exhibited in example 3 for shredded paper treated with 2-isopropoxy-camphane.

EXAMPLE 5

The procedure of example 1 is repeated using cages of the same dimensions, each containing two albino rats approximately 12 weeks old. 2-isopropoxy-camphane is applied to pinewood sawdust which is placed in the cages (250 grams per cage).

Undesirable odors are evident after 2 days in the control cage containing untreated pinewood sawdust. Objectionable odors are emitted by the cage containing treated pinewood sawdust and the cage containing cedar shavings after 7 days, necessitating the change of litter in the two remaining cages.

EXAMPLE 6

The procedure of example 5 is repeated, except that the pinewood sawdust is treated with 2-($\beta$-hydroxyethoxy)-camphane. The odor-inhibiting activity of the pinewood sawdust treated with 2-($\beta$-hydroxyethoxy)-camphane is substantially the same as or slightly greater than that exhibited in example 5 for pinewood sawdust treated with 2-isopropoxy-camphane.

EXAMPLE 7

The procedure of example 1 is repeated, except that the oak wood shavings are treated with 0.5 weight percent dimethyl phthalate basis the weight of the shavings in addition to the 2.0 weight percent 2-isopropoxy-camphane used in example 1.

The three animal-containing cages are placed in a room having a mild infestation of adult red roaches. After 12 hours red roaches are observed in the control cage containing litter of untreated oak wood shavings and in the test cage containing litter of cedar shavings. No red roaches are observed after 36 hours in the test cage containing litter of oak wood shavings treated with dimethyl phthalate and 2-isopropoxy-camphane. The odor-inhibiting activity is substantially the same as that exhibited in example 1.

EXAMPLE 8

The procedure of example 7 is repeated, except that the oak wood shavings are treated with 2.0 weight percent 2-($\beta$-hydroxyethoxy)-camphane and 0.5 weight percent dimethyl phthalate instead of the 2-isopropoxy-camphane and dimethyl phthalate of example 7. The insect repellent and odor-inhibiting activity obtained is substantially the same as or slightly greater than that exhibited in example 7.

What is claimed is:

1. An animal litter product including a particulate litter material containing an odor-inhibiting quantity of a compound of the formula:

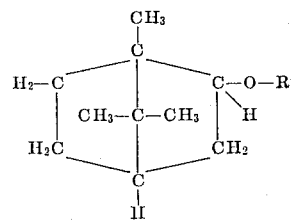

where R is selected from the group consisting of

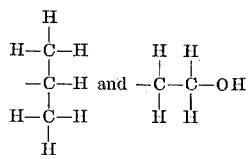

2. The product of claim 1 where the litter material is selected from the group consisting of wood chips, wood shavings, wood sawdust, excelsior, and wood fiber products.

3. The product of claim 1 where the odor-inhibiting compound is present in said product in the range of from about 0.5 to about 5.0 percent basis the weight of litter material.

4. The product of claim 1 where the odor-inhibiting compound is 2-isopropoxy-camphane.

5. The product of claim 1 where the odor-inhibiting compound is 2-($\beta$-hydroxyethoxy)-camphane.

6. The product of claim 1 including from about 0.05 to about 5.0 percent basis the weight of the litter material of an insect repellent compound noninjurious to warmblooded animals.

7. A process for inhibiting odors in animal bedding which comprises applying to a particulate litter material an amount of a compound within the scope of claim 1 effective for substantially inhibiting undesirable odors.

* * * * *